United States Patent
Brandwine et al.

(10) Patent No.: US 12,045,264 B2
(45) Date of Patent: *Jul. 23, 2024

(54) LOCAL DATA CLASSIFICATION BASED ON A REMOTE SERVICE INTERFACE

(71) Applicant: Amazon Technologies, Inc., Seattle, WA (US)

(72) Inventors: Eric Jason Brandwine, Haymarket, VA (US); Calvin Yue-Ren Kuo, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,324

(22) Filed: Nov. 14, 2022

(65) Prior Publication Data

US 2023/0073638 A1 Mar. 9, 2023

Related U.S. Application Data

(63) Continuation of application No. 16/000,612, filed on Jun. 5, 2018, now Pat. No. 11,500,904.

(51) Int. Cl.
*G06F 16/28* (2019.01)
*G06F 3/06* (2006.01)
(Continued)

(52) U.S. Cl.
CPC .......... *G06F 16/285* (2019.01); *G06F 3/0604* (2013.01); *G06F 18/24* (2023.01); *G06N 20/00* (2019.01)

(58) Field of Classification Search
CPC ...... G06F 16/285; G06F 18/24; G06F 3/0604; G06N 20/00
(Continued)

(56) References Cited

U.S. PATENT DOCUMENTS

| 8,024,656 B2 | 9/2011 | Behnen et al. |
|---|---|---|
| 8,140,584 B2 | 3/2012 | Guha |

(Continued)

OTHER PUBLICATIONS

International Search report and Written Opinion from PCT/US2019/034522, dated Aug. 21, 2019, (Amazon Technologies, Inc.), pp. 1-13.

(Continued)

*Primary Examiner* — Hosain T Alam
*Assistant Examiner* — Nicholas E Allen
(74) *Attorney, Agent, or Firm* — Robert C. Kowert; Kowert, Hood, Munyon, Rankin & Goetzel, P.C.

(57) ABSTRACT

A connected device at a client network implements a local data classification service for classifying data based on a data classification service of a remote provider network. The local data classification service receives a request to classify data at one or more data sources of the client network. The request is initiated from a client device of the client network according to a management interface for a data classification service of a remote provider network (e.g., using the same API request used by the remote classification service). The local data classification service obtains at least some of the data from the one or more data sources of the client network. The local data classification service classifies the obtained data according to different types of sensitivity using the data classification engine in the execution environment without the data being exposed outside of a data isolation boundary of the client network.

20 Claims, 9 Drawing Sheets

(51) Int. Cl.
    *G06F 18/24*   (2023.01)
    *G06N 20/00*   (2019.01)
(58) Field of Classification Search
    USPC ......................................................... 707/737
    See application file for complete search history.

(56) References Cited

U.S. PATENT DOCUMENTS

| | | | |
|---|---|---|---|
| 9,141,658 B1 | 9/2015 | Nair et al. | |
| 9,703,855 B1 | 7/2017 | Smalley | |
| 9,807,101 B1 | 10/2017 | Lu | |
| 11,443,058 B2 | 9/2022 | Brandwine et al. | |
| 11,500,904 B2 | 11/2022 | Brandwine et al. | |
| 2008/0120129 A1 | 5/2008 | Seubert | |
| 2010/0274750 A1 | 10/2010 | Oltean et al. | |
| 2010/0312769 A1 | 12/2010 | Bailey et al. | |
| 2012/0150773 A1 | 6/2012 | DiCorpo et al. | |
| 2012/0303558 A1 | 11/2012 | Jaiswal | |
| 2014/0059696 A1 | 2/2014 | Gventer | |
| 2014/0059700 A1 | 2/2014 | Kiriyama et al. | |
| 2014/0156650 A1 | 6/2014 | Jacobson | |
| 2014/0289190 A1 | 9/2014 | Chan et al. | |
| 2015/0302097 A1 | 10/2015 | Focacci | |
| 2015/0326601 A1 | 11/2015 | Grondin | |
| 2015/0339369 A1 | 11/2015 | Rais-Ghasem et al. | |
| 2015/0381610 A1 | 12/2015 | Poornachandran et al. | |
| 2016/0012541 A1 | 1/2016 | Harrington | |
| 2016/0124957 A1 | 5/2016 | Rayes et al. | |
| 2016/0162576 A1 | 6/2016 | Arino de la Rubia | |
| 2016/0180468 A1 | 6/2016 | Buss et al. | |
| 2016/0188700 A1 | 6/2016 | Kleinschnitz, Jr. et al. | |
| 2016/0300288 A1 | 10/2016 | Nemery De Bellevaux et al. | |
| 2016/0350674 A1 | 12/2016 | Midboe | |
| 2016/0379139 A1 | 12/2016 | Eldar et al. | |
| 2017/0060986 A1 | 3/2017 | Ideses et al. | |
| 2017/0094018 A1 | 3/2017 | Ekstrom et al. | |
| 2017/0118282 A1* | 4/2017 | Lee .................. H04L 67/1097 | |
| 2017/0193362 A1 | 7/2017 | Cremer et al. | |
| 2017/0206377 A1* | 7/2017 | Wyatt ................. G06F 21/6245 | |
| 2017/0235647 A1 | 8/2017 | Kilaru | |
| 2017/0255680 A1 | 9/2017 | Malatesha et al. | |
| 2017/0262185 A1 | 9/2017 | Long et al. | |
| 2017/0289088 A1 | 10/2017 | Quintero | |
| 2017/0316220 A1 | 11/2017 | Eldar et al. | |
| 2018/0025179 A1 | 1/2018 | Antonatos et al. | |
| 2018/0027006 A1* | 1/2018 | Zimmermann ..... G06F 21/6218 726/11 |
| 2018/0034715 A1 | 2/2018 | Nagaraju | |
| 2018/0075138 A1 | 3/2018 | Perram et al. | |
| 2018/0075254 A1 | 3/2018 | Reid et al. | |

OTHER PUBLICATIONS

A.K. Jain et al, "Data Clustering: A Review", ACM Computing Surveys, VOl. 31, No. 3, Sep. 1999, pp. 264-323.

Office Action dated Aug. 25, 2022 in European Patent Application No. 19736532.3, Amazon Technologies, Inc., pp. 1-8.

Summons to attend oral proceedings mailed May 21, 2024 in European patent application No. 19736532.3, Amazon Technologies, Inc.

* cited by examiner

LOCAL DATA CLASSIFICATION BASED ON A REMOTE SERVICE INTERFACE

This application is a continuation of U.S. patent application Ser. No. 16/000,612, filed Jun. 5, 2018, which is hereby incorporated by reference herein in its entirety.

BACKGROUND

Remote data storage services are often used by organizations to store large amounts of generated data. For example, banks may store personal and financial data for customers at a remote provider network of a service provider. Due to the massive amount customer data that is stored by a service provider on behalf of a client, the remote provider network may provide various software services to organize and manage the data. For example, remote software services may classify the data into different categories, monitor usage of the data, and protect the data from unauthorized access. After customer data for a bank is uploaded to a remote provider network for storage, different portions of the customer data may be classified based on different levels of sensitivity. For example, financial data such as credit card numbers may be classified at a higher level of sensitivity than personal data such as customer names.

Due to the highly confidential nature of certain types of data, a client of a remote data storage service may decide to store some of its data on premises instead of at the remote provider network. In some cases, regulations may require that a particular type of data must be stored on premises (e.g., at a local client network) instead of being stored at a remote site. However, the client may have a large amount data stored among various database systems throughout the local network. Therefore, it may be time-consuming for the client to locate different types of data and to identify whether the data, once located, can be transmitted to a remote provider network for storage or must remain on premises.

Figure 1:
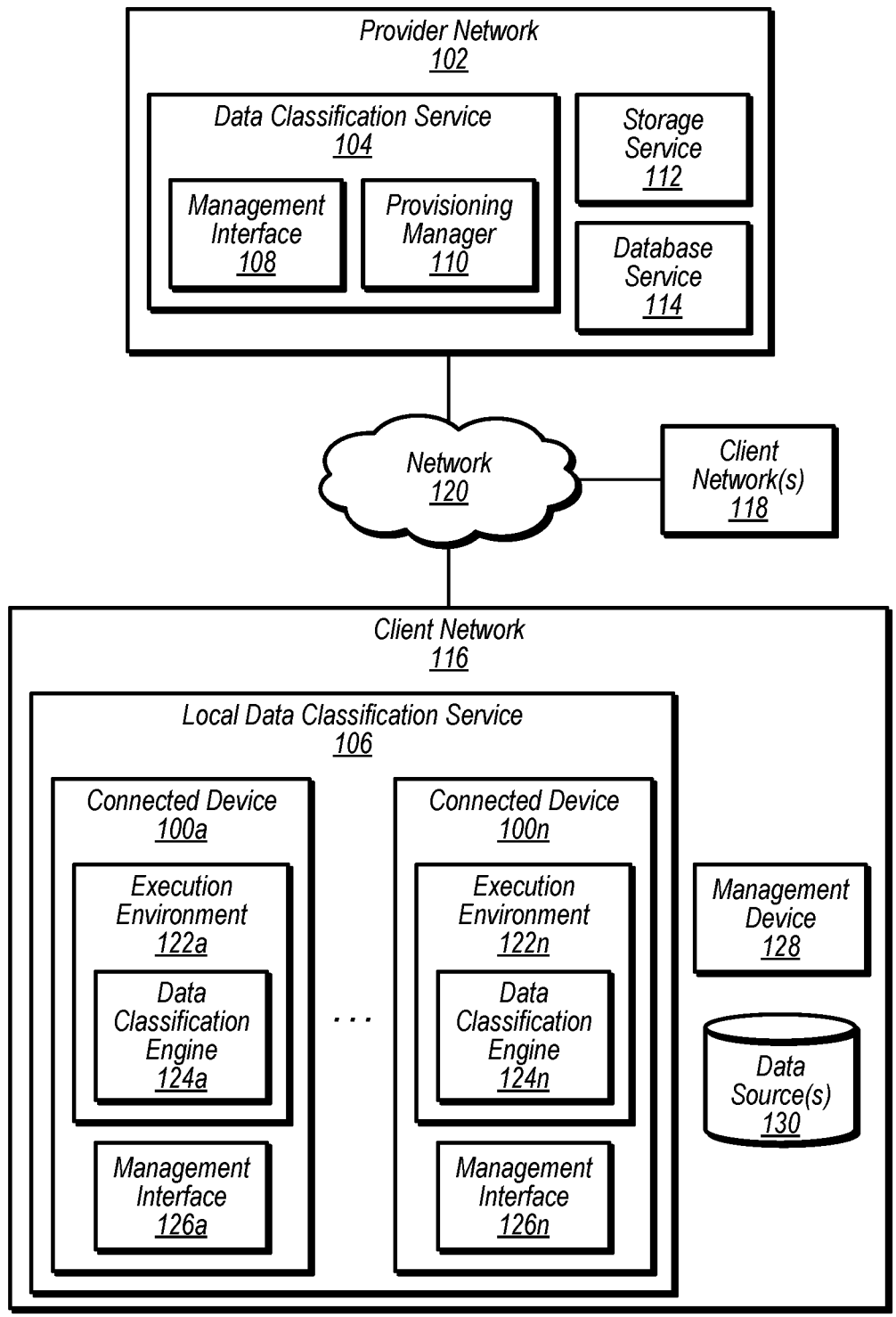
FIG. 1 illustrates a system for classifying data at a client network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement classifying data at a client network based on a data classification service of a remote provider network. In embodiments, a computing device connected to a client network implements a local data classification service. The local data classification service provides an execution environment to run a data classification engine.

In some embodiments, the local data classification service receives a request to classify data at one or more data sources of the client network. The request may be initiated from a client device of the client network according to a management interface for a data classification service of a remote provider network. For example, the parameters and/or the format of the generated request may be the same as those that were previously used for requests to control the data classification service of a remote provider network. This may allow a user to easily transition from using the data classification service of the remote provider network to using the local data classification service of the client network. Thus, in embodiments, the same application programming interface (API) requests may be used to control the local data classification service as were previously used to control the data classification service of a remote provider network.

In response to receiving the request to classify data, the local data classification service may obtain some or all of the data from the one or more data sources of the client network and classify the obtained data. In embodiments, the local data classification service may classify the obtained data according to different types of sensitivity using the data classification engine in the execution environment without the data being exposed outside of a data isolation boundary of the client network. For example, policies or regulations may require that at least some of the data (e.g., sensitive data such as financial or health data) is not exposed outside of a data compliance boundary of the client network.

In some embodiments, a data classification service of a provider network may provision a local instance of the data classification service to run on a computing device of a remote client network. For example, the provider network may download to a remote client network a data classification engine and an execution environment to run the data classification engine within the local instance of the network-based data classification service.

In embodiments, the data classification service of the provider network receives via a management interface a request from the client network to classify data at one or more data sources of the client network. The data classification service of the provider network may then transmit (e.g., redirect) the request to the local instance of the data classification service at the remote client network. In embodiments, this may allow a user to easily transition from using the data classification service of the remote provider network to using the local data classification service of the client network. Therefore, in embodiments, the same management interface at the remote provider network may be used to receive API requests to control the local data classification service at the client network and to receive API requests to control the data classification service of the remote provider network.

In embodiments, a "connected device" or an "edge device" may refer to the same type of internet-connectable device. In various embodiments, a connected device or an edge device may refer to any type of computing device suitable for communicating, via one or more networks, with one or more devices of a remote network (e.g., remote provider network) and/or any other devices of the same local network. Note that, in embodiments, a connected device may not always be connected to a provider network and/or client network, yet still perform any of the described functionality (e.g., data classification) and may transmit data to and from the provider network and/or client network once connectivity is re-established (e.g., in the event of a temporary disconnection). In embodiments, an "endpoint" may be one or more computing devices and/or one more services that are part of a local network or a remote network, such that information may be transmitted to or from the endpoint via one or more network connections. In some embodiments, machine learning may be implemented using any suitable machine learning/artificial intelligence techniques (e.g., neural networks, deep neural networks, reinforcement learning, decision tree learning, genetic algorithms, classifiers, etc.).

By classifying data at a client network based on a data classification service of a remote provider network, various embodiments allow for advantages over traditional techniques for classifying data at a client network. For example, a client of a service provider may wish to classify data at its local network sending the data to a remote provider network and using a remote data classification service of the remote provider network. However, for various reasons, a portion of the data may be required to remain at the local network and/or to remain within a data isolation boundary (e.g., to protect data and/or comply with policies/regulations).

Traditionally, the client may resort to manually classifying the portion of data, writing custom scripts to classify the portion of data, and/or using a third-party tool. However, these options are time-consuming and error-prone. For example, integrating new scripts and/or software tools with existing software may introduce more errors, consume more computing and storage resources, and increase the time required to process and classify data. Therefore, using the above techniques may not classify data as accurately and/or as efficiently as the remote data classification service would have. Moreover, users may have to be undergo extensive training to implement a new process and/or use a new tool to classify data on premises, which may also be time-consuming and cause more classification errors.

The techniques described herein for classifying data at a client network based on a data classification service of a remote provider network provide solutions to the above problems. For example, the same management interface and/or the same API requests may be used to classify local data using a local data classification service at the client network as is used to classify remote data using a remote data classification service at the client network. Therefore, a client may quickly transition from using the remote data classification service to using the local data classification service without causing classification errors, without increasing time required to classify data, and/or without consuming additional computing resources. Furthermore, a client may download from a provider network updates to a classification model and apply those updates to a local model to improve accuracy of data classification and reduce time required to classify data. In some embodiments, the service provider may leverage data collected from other clients as model training data, which is used to provide the updates to the classification model.

FIG. 1 illustrates a system for classifying data at a client network, according to some embodiments. The connected devices 100 depicted in FIG. 1 may be the same type of connected device, and include some or all of the same components as other connected devices depicted in FIGS. 1-4, in embodiments. Although certain components of the provider network 102, the data classification service 104, and/or the local data classification service 106 are described as performing various actions in FIGS. 1-4, any of those actions may be performed by any hardware and/or software component of the provider network 102, the data classification service 104, the local data classification service 106, or any other components of the networks in FIGS. 1-4.

In the depicted embodiment, the data classification service 104 includes a management interface 108 and a provisioning manager 110. The provider network 102 also includes a storage service 112 and a database service 114. Any of the above service may be used by the client network 116 and/or one or more other client networks 118. As shown, the provider network 102 may transmit data to and from devices of any of the client networks 116, 118 via a wide-area network 120 (e.g., the Internet).

As shown, the local data classification service 106 may include any number of connected devices 100. Each connected device may include an execution environment 122 that runs a data classification engine 124. Each connected device also includes a management interface 126 for managing the local data classification service 106 and/or components of the local data classification service 106. In embodiments, the data classification engine 124 includes one or more models that are implemented by the execution environment 122 and/or the data classification engine 124 to classify data. In some embodiments, the data classification engine 124 includes a machine learning framework for implementing the one or more models. The client network 116 also includes a management device 128 and one or more data sources 130 (e.g., databases and/or any other suitable structures for storing data).

In some embodiments, two or more of connected devices 100 may include the same data classification engines 124 and/or the same data model for processing data. Therefore, multiple classification engines may classify data in parallel to increase a rate that an amount of data classified. In some embodiments, one or more of the data classification engines 124 and/or the data models may be different than any number of other ones of the data classification engines 124 and/or the data models. In such embodiments, different data classification engines 124 and/or data models may produce different classification results for the same portion of data. Therefore, although the local data classification service may be described herein as implemented by one connected device, in other embodiments any other number of connected devices may implement the local data classification service.

In embodiments, the local data classification service 106 receives a request to classify data at one or more data sources 130 of the client network 116. The request may be initiated from a client device (e.g., management device 128) of the client network according to a management interface for a data classification service of a remote provider network. Therefore, the request may be initiated and/or generated in the same way as a request for the data classification service 104 to classify data at one or more data sources. Thus, a user may use the management device 128 (e.g., via a graphical user interface and/or command line interface) to provide input to initiate the request. In embodiments, the user may select one or more of the data sources using a graphical user interface and/or command line interface.

In some embodiments, the management device transmits the request to the management interface 126a of the local data classification service 106. Therefore, the management interface 126a receive from the management device 128 the request to classify data at one or more of the data sources 130.

In another embodiment, the management device instead transmits the request to the management interface 108 of the data classification service 104 of the provider network 102. The management interface 108 then transmits and/or re-directs the request to the management interface 126a of the local data classification service 106. In embodiments, the request may be processed and/or modified before the request is transmitted and/or re-directed to the management interface 126a of the local data classification service 106. For example, a format of the request may be changed. In some embodiments, the request is received from the client may be in accordance with one network communication protocol (e.g., hyper-text transport protocol (HTTP)), and the request is modified and transmitted to the management interface 126a of the local data classification service 106 in accordance with another network communication protocol (e.g., message queuing telemetry transport (MQTT)). In embodiments, HTTP, MQTT, and/or any other suitable network communication protocol may be used by any of the devices herein to communicate with another device.

In some embodiments, the data classification service 104 of the provider network 102 may provide various data management tools that allow a client user to easily identify the locations of data that has and/or has not yet been classified. For example, the user may then select one or more of the locations for the local data classification service 106 to obtain data from and to classify.

In an embodiment, the data classification service 104 of the provider network 102 may receive via the management interface 108 a request from the management device 128 to provide locations of data sources of the client that have data that has not yet been classified or is available to be classified. The data classification service 104 of the provider network 102 may determine one or more data sources of the client that each have data that has not yet been classified or is available to be classified (e.g., data sources at the client network 116, provider network 102, and/or one or more other networks at one or more different geographic locations).

In embodiments, the data classification service 104 of the provider network 102 may then provide to the management device 128 an indication of the different data sources of the client that each have data that has not yet been classified or is available to be classified. In embodiments, the management device 128 may display on a graphical user interface a list or map that indicates data sources at the client network 116, provider network 102, and/or one or more other networks at one or more different geographic locations.

In some embodiments, the indication provided to the management device 128 may depend on one or more factors. The indication may be based on one or more of a geographic location of a client device that submitted the request, a user (e.g., permissions assigned to the user) that submitted the request, and a type (e.g., permissions assigned to the type) of the client device that submitted the request. For example, a user in the United States may be provided certain data sources located in the United States but not provided certain data sources located in another country. In some cases, some data sources are provided and some are not provided, based on the user having certain access permissions and/or using a type of client device (e.g., smart phone or on-premises server).

In various embodiments, a client may use the data classification service of the provider network to classify data at the provider network in a same or similar way as the client uses the local data classification service to classify data at the client network. Thus, a client user may use the same management device 128 to classify data at the provider network and/or the client network. For example, the data classification service 104 of the provider network 102 may receive via the management interface 108 a request from the management device 128 to classify data at one or more data sources at the provider network, wherein the request indicates at least the one or more data sources. The data classification service 104 of the provider network 102 may then obtain some or all of the data from the one or more other data sources of the provider network and classify the obtained data according to different types of sensitivity using a data classification engine (e.g., using one or more data classification models) of the provider network.

In embodiments, the execution environment, the data classification engine, the management interface, the connected device, and/or any other components of the local data classification service may be obtained from the remote provider network. For example, the provisioning manager 110 may download to the client network and/or the connected device 100a the execution environment, the data classification engine, the management interface, and/or any other components of the local data classification service.

In some embodiments, the service provider may provision the connected device 100a and then ship/send the connected device 100a to the client (e.g., a client site that may include the client network). Thus, in certain embodiments, the connected device may be a shippable storage device that includes a data store. For example, the provisioning manager 110 may provision the connected device 100a at the provider network via a physical, internet, and/or wireless connection to the connected device 100a. To provision the connected device 100a, the provisioning manager 110 may download and/or install the execution environment, the data classification engine, the management interface, and/or any other components of the local data classification service to the connected device 100*a*. The connected device 100*a* may then be shipped to the client.

In embodiments, after classifying obtained data as described herein, the local data classification service of the shippable storage device may store some portions of the obtained data at the data store of the shippable storage device based on the different types of sensitivity classifications for different portions of the obtained data. The local data classification service may then provide to the client network (e.g., the client management device) or to the provider network (e.g., to the management interface and/or the data classification service) an indication that the one or more portions of the obtained data have been classified and stored at the data store of the shippable storage device (and that the shippable storage device is ready to be shipped back to the service provider and/or provider network).

In embodiments, the client may then disconnect the shippable storage device and ship it back to the service provider and/or provider network (or any other location associated with a storage service provider). The classified data may then be ingested by a storage service of the provider network/storage service provider. In some embodiments, some or all of the classified data is encrypted by the shippable storage device (e.g., by the local data classification service) before it is stored at the data store in encrypted form. This technique may allow a client to transfer extremely large quantities of data to a storage service at a faster rate than would otherwise be possible using data transmission over the internet. This may also provide a more secure method for transferring data, since there is not electronic data transmissions that may be intercepted or received by unauthorized recipients.

In various embodiments, the local data classification service 106 may be considered an "event-driven" service, since the service may invoke and/or execute functions in response to detecting associated events, as discussed herein (e.g., receiving data, receiving requests to classify data, or any other suitable trigger). For example, the function may execute the data classification engine 124. In embodiments, the local data classification service 106 includes a function that is registered for invocation in the execution environment in response to detection of a defined event (e.g., receiving a request to classify data at one or more data sources). When the local data classification service 106 detects the event, the service 106 invokes the function. The function then executes the data classification engine 124 in the execution environment 122 to classify the obtained data.

In various embodiments, an execution environment 122 may include a java virtual machine capable of executing a function registered with the local data classification service 106. In embodiments, an execution environment may be any other type of execution environment capable of executing a registered function.

In embodiments, the execution environment may terminate the function and/or data classification engine upon completion of one or more tasks responsive to the event (e.g., classifying obtained data). In embodiments, this may reduce computing resource usage, because functions and associated resources to run the functions will only be used when responding to events. In some embodiments, to improve data security for the obtained data and/or to free up computing resources, the local data classification service does not save any execution state or any of the obtained data when the registered function is terminated.

Figure 2:
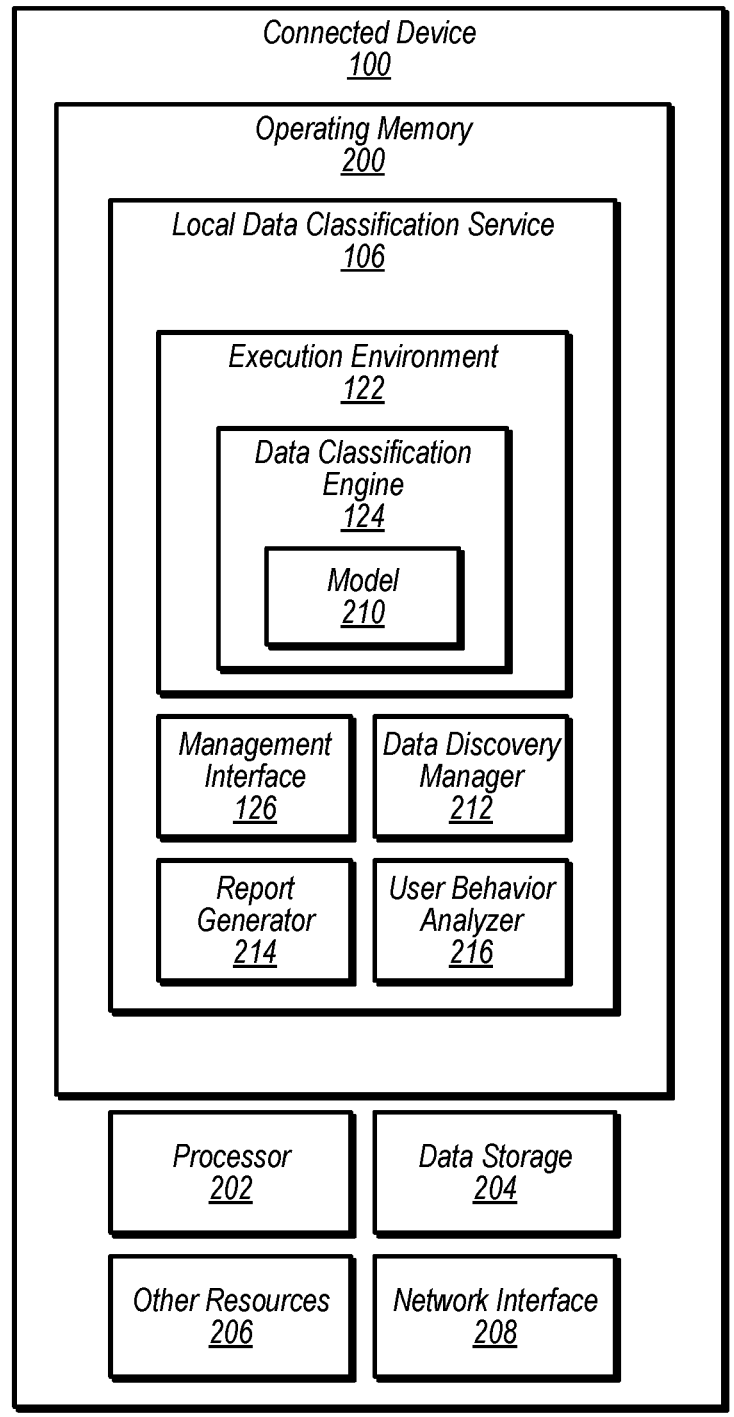
FIG. 2 is a block diagram illustrating example components of a connected device that implements a data classification engine, according to some embodiments.

FIG. 2 is a block diagram illustrating example components of a connected device that implements a data classification engine, according to some embodiments. In the depicted embodiment, the connected device 100 includes operating memory 200 (e.g., volatile memory and/or non-volatile memory), a processor 202 (e.g., CPU), data storage 204, other resources 206 (e.g., GPUs, FPUs, etc.), and a network interface 208. In embodiments, the connected device 100 may include one or more additional memories and/or processors.

In some embodiments, the other resources 206 may include non-volatile memory that stores code for executing the local data classification service 106 and/or any components of the local data classification service 106. In some embodiments, the local data classification service 106 and/or any components of the local data classification service 106 may be loaded into the operating memory 200 (e.g., after reboot or power failure).

The operating memory implements various components of the local data classification service 106, including the execution environment 122 suitable for running the data classification engine 124, which may include a data classification model 210. In embodiments, the data classification engine 124 includes a machine learning framework. As depicted, the local data classification service 106 also includes a management interface 126, a data discovery manager 212, a report generator 214, and a user behavior analyzer 216, described in more detail below.

In embodiments, the execution environment may provide for event-driven execution of one or more functions, including one or more functions to execute the data classification engine to classify data obtained from one or more data sources 130. For example, a function may be invoked in response to the local data classification service 106 (e.g., execution environment 122) detecting a defined triggering event. In embodiments, the defined triggering event may be receiving a portion of data from the one or more data sources 130 and/or receiving by the local data classification service 106 a request to classify data obtained from one or more data sources 130.

When the function is invoked, the execution environment 122 may execute the data classification engine 124 and/or the model 210 to classify the obtained data to generate results. In embodiments, the results may include an indication of a storage location and type of sensitivity for one or more respective portions of data. For example, the results may indicate/identify a particular database as a storage location for a first portion of data and indicate/identify the first portion of data as having high sensitivity (e.g., bank account number) and the results may indicate/identify a different database as a storage location for a second portion of the data and indicate/identify the second portion of data as having a lower sensitivity than the first portion (e.g., customer name). In embodiments, the local data classification service may perform one or more actions based on the received results (e.g., issue one or more commands to another client device of the client network or provide an indication of the results to a graphical user interface of a client device of the client network).

In embodiments, the network interface 208 communicatively couples the connected device 100 to the local network. Thus, the connected device 100 transmits data to and/or receives data from one or more other data source devices, connected devices, the machine learning deployment service 104, or other endpoints of the provider network 102 or client networks 116 via the network interface 208. In embodiments, the network interface 208 may transmit and receive data via a wired or wireless interface.

In various embodiments, the connected device 100 may provide high levels of security (e.g., encrypted messages) to protect data being communicated between connected devices and also between the connected device and the provider network 102. The connected device may provide a simple yet powerful processor and/or operating system to provide platform-agnostic capabilities. In some embodiments, the size of one or more memories and/or one or more processors used by one or more servers of the provider network 102 to implement services (e.g., data classification service 104) may be at least an order of magnitude larger than the size of the memory and/or the processor used by the connected device 100. However, the connected device 100 may still be powerful enough to run a same or similar execution environment 122 as one that runs on one or more servers of the provider network 102, in order to execute the same data classification engine, model, and/or event-driven functions.

Figure 3:
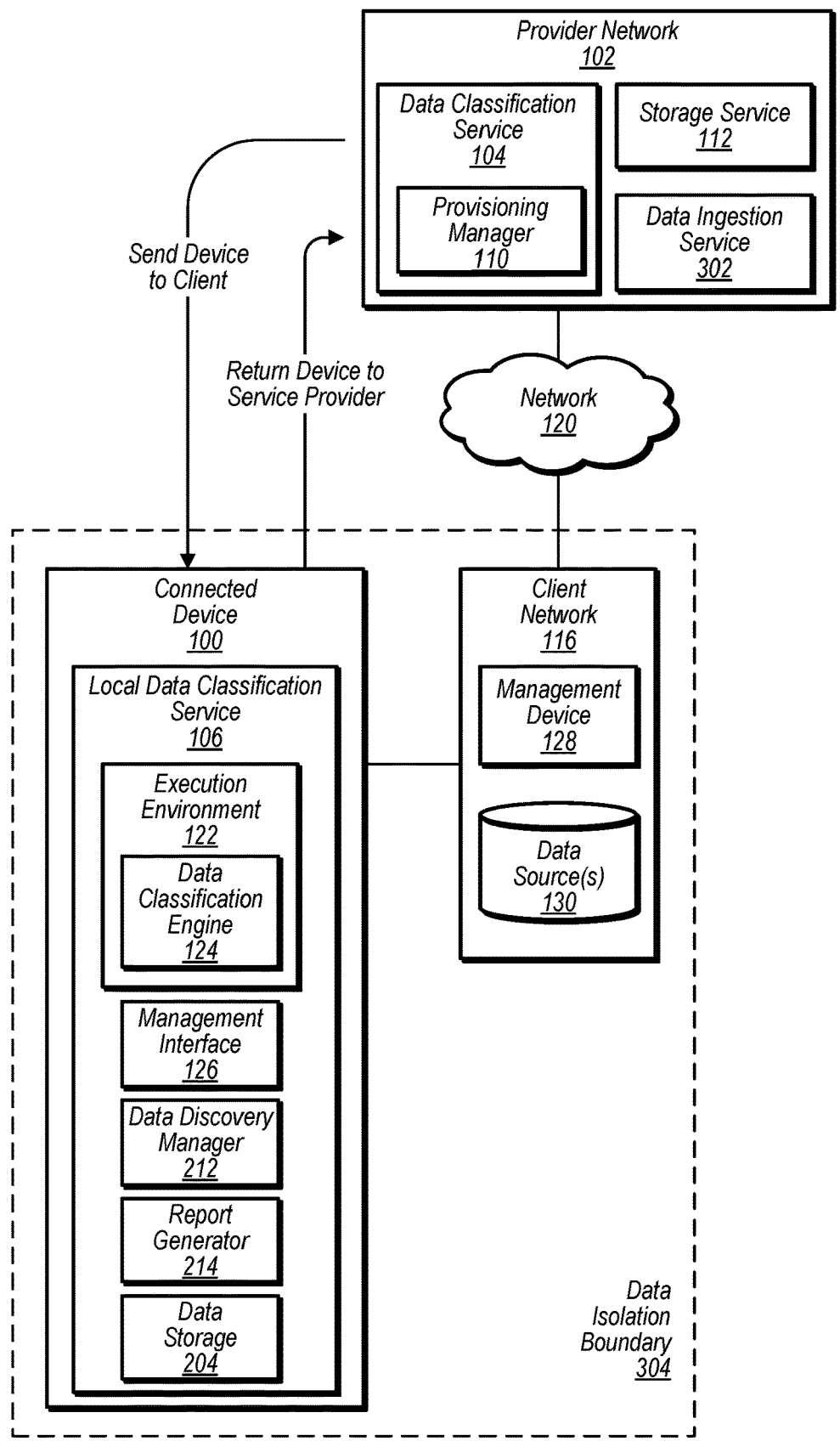
FIG. 3 illustrates a system for classifying data at a client network using a device provided by a remote service provider, according to some embodiments.

FIG. 3 illustrates a system for classifying data at a client network using a device provided by a remote service provider, according to some embodiments. As shown, the provider network 102 also includes a data ingestion service 302. As described below, the data ingestion service 302 may ingest data from a storage device at the provider network 102.

In the depicted embodiment, the connected device 100 is provisioned by the service provider at the provider network 102. As described above, the service provider may provision the connected device 100a at the provider network 102 and then ship/send the connected device 100a to the client. The provisioning manager 110 may download and/or install the execution environment, the data classification engine, the management interface, and/or any other components of the local data classification service to the connected device 100a. The connected device 100a may then be shipped to the client.

When the client receives the connected device 100, it is connected to the client network via a physical, internet, and/or wireless connection. Any of various authentication methods may be employed to authorize and/or verify that the connected device was sent from the service provider and has not been tampered with or modified.

In the example embodiment, the connected device 100 and components of the client network 116 are within a data isolation boundary 304. In embodiments, data (or data of a certain type of sensitivity) within the data isolation boundary may be prevented from being exposed outside of the data isolation boundary 304. For example, local data classification service 106 and components of the client network 116 may be configured to store and/or process data without the data being exposed outside of the data isolation boundary.

In some embodiments, some devices and/or data sources of the client network may be within the data isolation boundary and others may not. Therefore, in some cases only a sub-network of the client network 116 may be within the data isolation boundary. The data isolation boundary may include one or more organizations, local networks, or geographical areas (e.g., city, state, country, etc.).

In embodiments, the client may define the data isolation boundary and/or set policies to determine which types of data are to remain within the data isolation boundary. In embodiments, an external organization may maintain or establish guidelines to determine which types of data are to remain within the data isolation boundary. For example, guidelines may dictate that certain types of credit card data or health data must remain within the data isolation boundary.

In various embodiments, before the local data classification service 106 can obtain data to classify, the data discover manager 212 may first be used to discover the one or more data sources of the client network 116. In embodiments, the management interface 126 may receive a request from the management device 128 to discover data sources of the client network. In response, the data discovery manager 212 discovers (e.g., crawls the network to identify) some or all of the data sources 130 of the client network that include data to be classified or capable of being classified by the local data classification service 106. Any suitable technique may be used to discover the data sources. For example, the local data classification service 106 may implement different data connectors to interface with different types of data sources (e.g., databases, file systems, etc.).

As described above, the local data classification service 106 may obtain data and classify the obtained data to generate results. The results may include an indication of a storage location that each portion of the obtained data was obtained from and a type of sensitivity (e.g., sensitivity level or sensitivity category) for each portion of the obtained data. In embodiments, any suitable number or label (e.g., "1" or "low") may be used to indicate sensitivity of a portion of data (e.g., as metadata associated with or stored with the portion of data). For example, one portion of data may be assigned "1" or "low" to indicate it is classified at a lower sensitivity than another portion of data assigned "3" or "high." Any number of different levels of sensitivity may be assigned to a given portion of data, in embodiments. In embodiments, after classifying the obtained data, the report generator 214 generates a report based on the results.

The report may indicate different sensitivity classifications (e.g., via associated metadata) for different portions of the obtained data. The report may also indicate the location that each portion of the obtained data was obtained from (e.g., which data sources each portion of the obtained data was obtained from). In embodiments, some or all of the data sources still retain a copy of any data that was obtained by the local data classification service 106.

In embodiments, based on the report, the local data classification service 106 may determine that one or more portions of the obtained data may be transmitted to the provider network for storage (e.g., at the storage service 112). For example, the local data classification service may determine that a first set of data that was classified as having low sensitivity (e.g., below a threshold level of sensitivity) may be transmitted to the provider network for storage. However, the local data classification service may determine that a second set of data that was classified as having a higher sensitivity (e.g., at or above the threshold level of sensitivity) may not be transmitted to the provider network for storage.

In various embodiments, data that is received by the provider network 102 (e.g., by the data classification service 104) may be flagged to indicate that it has already been classified. This may eliminate any unnecessary processing or classification of data, saving compute resources. For example, the data classification service 104 may receive from the local instance of the network-based data classification service 106 portions of data from the data sources 130 and metadata that indicates the received portions data have already been classified by the local instance of the network-based data classification service 106.

In some embodiments, the local data classification service may store the first set of data storage 204 (e.g., non-volatile storage memory) of the local data classification service. The local data classification service may encrypt the data using one or more keys associated with an account of the client (e.g., keys that are also maintained by the provider network on behalf of the client). After data classification at the client network is complete, the connected device may be disconnected from the client network and shipped back to the service provider.

In embodiments, when the service provider receives the connected device 100, it is connected to the provider network via a physical, internet, and/or wireless connection. Any of various authentication methods may be employed to authorize and/or verify that the connected device was sent from the client and has not been tampered with or modified.

The data ingestion service 302 may then obtain the data from the connected device and store the data at the storage service. In embodiments, the data ingestion service may decrypt the data as part of the ingestion process. For example, the data may be decrypted using the one or more keys associated with an account of the client.

Figure 4:
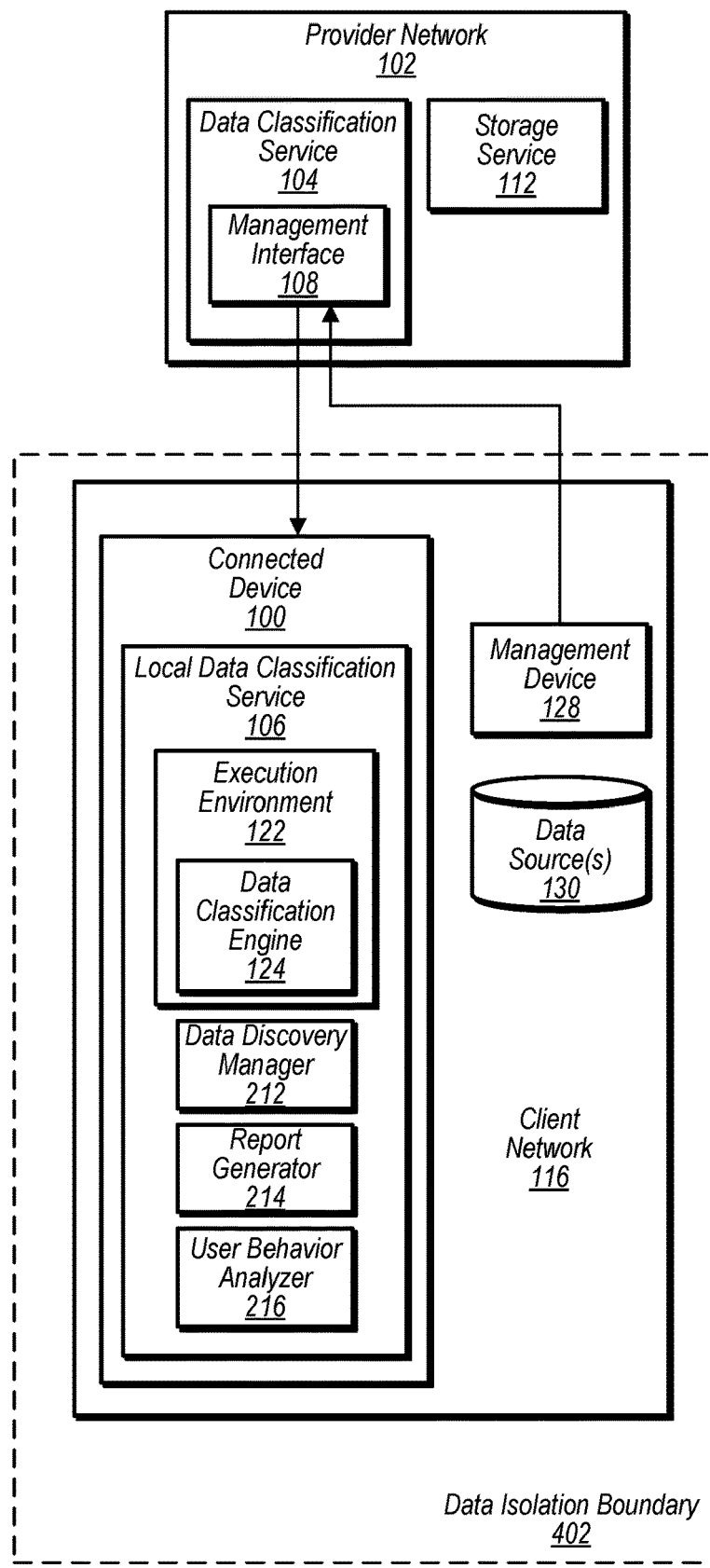
FIG. 4 illustrates a system for classifying data at a client network via a management interface of a remote provider network, according to some embodiments.

FIG. 4 illustrates a system for classifying data at a client network via a management interface of a remote provider network, according to some embodiments. As depicted, the client network 116 is included within a data isolation boundary 402. Therefore, some or all data within the data isolation boundary 402 is prevented from being exposed to any devices or networks outside of the boundary, include the provider network 102. However, management requests (e.g., API request) may still be sent to the provider network.

As shown, the data classification service 104 of the provider network may receive via a management interface 108 a request from the client network to classify data at one or more data sources 130 of the client network. The data classification service of the provider network may then transmit the request to the local instance of the data classification service 106 at the remote client network. As described above, the local instance of the data classification service 106 may then obtain data and classify the obtained data according to different types of sensitivity.

Note that in some embodiments, the same management interface 108 at the remote provider network may be used to receive API requests to control the local data classification service 106 at the client network and to receive API requests to control the data classification service 104 of the remote provider network. Therefore, a user at the client network may select the data classification service of the remote provider network 104 to classify remote data (e.g., data transmitted from the client network that has not yet been classified) or may select the local data classification service 106 to classify local data at the client network.

In embodiments, any other components of the local instance of the data classification service 106 may be controlled and/or used via requests (e.g., API requests) from the client network that are sent to the management interface 108 and routed back down to the local data classification service 106. For example, the data classification service of the remote provider network 104 may receive via the management interface 108 a request from the client network to discover data sources of the client network. In response, the management interface 108 may transmit the request to the local data classification service 106 (e.g., to the data discovery manager 212). The data discovery manager 212 may then discover data and/or data sources at the client network (e.g., as described above).

In embodiments, the user behavior analyzer 216 may be used to monitor data usage at some or all of the data sources. Based on the data usage, the user behavior analyzer 216 may generate an alert. For example, if the user behavior analyzer 216 determines that data access patterns indicate unauthorized access of data or a breach of secured data, then user behavior analyzer 216 may alert one or more users. For example an alert message may be transmitted to the management device 128 and/or other computing devices of the client network. The alert may indicate the data that was accessed and/or the user that accessed the data. In embodiments, the user behavior analyzer 216 may monitor data that has been classified by the data classification engine as being assigned a level of sensitivity above a threshold level.

Figure 5:
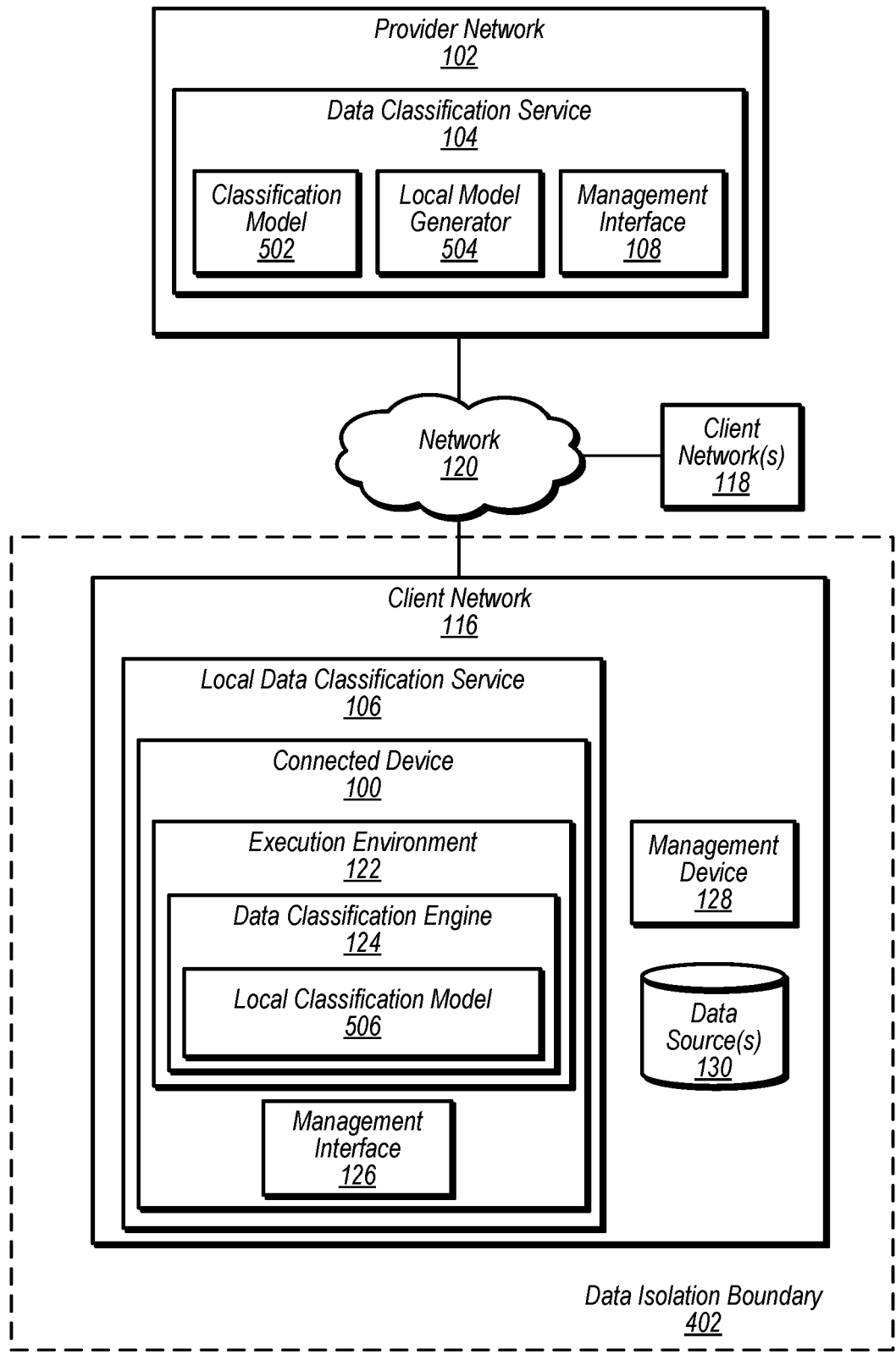
FIG. 5 illustrates a system for performing split data classification between a classification service of a provider network and a local data classification service, according to some embodiments.

FIG. 5 illustrates a system for performing split data classification between a classification service of a provider network and a local data classification service, according to some embodiments. As depicted, the client network 116 is included within a data isolation boundary 402. Therefore, some or all data within the data isolation boundary 402 is prevented from being exposed to any devices or networks outside of the boundary, include the provider network 102. However, management requests (e.g., API request) may still be sent to the provider network.

As shown, the data classification service 104 of the provider network includes a data classification model 502, a local model generator 504, and a management interface 108. As described below, in some embodiments, the local model generator 504 may generate a local classification model 506 for deployment to the client network.

In embodiments, the local data classification service 106 receives a request to classify data at data sources of the client network 116. The local data classification service 106 may obtain data from the data sources of the client network. The local data classification service 106 may then process the data using the local classification model 506 to generate intermediate results without the data being exposed outside of the data isolation boundary 402. In embodiments, the processing of the data may include one or more initial operations to classify the obtained data to generate intermediate results. In embodiments, the intermediate results does not expose some or all of the obtained data. In other words, some or all of the obtained data cannot be determined based on the intermediate results (e.g., due to anonymizing of data, obfuscation of data, removal of personally identifiable information or other sensitive data, etc.).

In various embodiments, the local data classification service 106 may then send the intermediate results to the data classification service 104 of the provider network 102. The data classification service 104 may then process the intermediate results using the classification model 502 to generate data classification results. These classification results may then be transmitted to the local data classification service 106 and/or another endpoint at the client network 116, the provider network 102, or other network.

In some embodiments, the available computing power of the data classification service 104 of the provider network 102 is much more powerful than that the available computing power of the local data classification service 106. For example, processors and/or memory may be faster and/or larger (e.g., at least by several orders of magnitude). Therefore, a client may send the intermediate classification results to the provider network for final stages of classification processing to achieve faster and/or more accurate data classification results than would be obtained if all of the classification processing were performed at the client network. In embodiments, this technique allows a client to leverage the computing power of the provider network, while still preventing some or all of the obtained data (e.g., sensitive data) from being exposed outside of a data isolation boundary.

In some embodiments, a client may leverage data that has been collected and stored at multiple different locations (e.g., different networks, different cities, countries, etc.) in order to train models for classifying data at a particular location (e.g., client network 116). As depicted, the local model generator 504 may obtain training data from one or more data sources of the client, which may include data sources at the client network 116, data sources at the provider network 102, and data sources at another remote network other than the client network 116 (e.g., other networks owned or managed by the client).

In embodiments, the local model generator 504 may then train the local classification model 506 based on the above obtained data and send the trained local classification model 506 to the local data classification service 106. Thus, the local classification model 506 may be trained and/or configured to be used by the local data classification service 106 to classify data at the client network 116. In embodiments, by leveraging the much larger training data set at the provider network to generate the local classification model 506, more accurate data classification results may be obtained than would be obtained if the training data set were only based on data from the client network 116 and/or other generic training data. Moreover, the client may leverage the computing power of the provider network to generate a local classification model faster than it could be generated locally.

Figure 6:
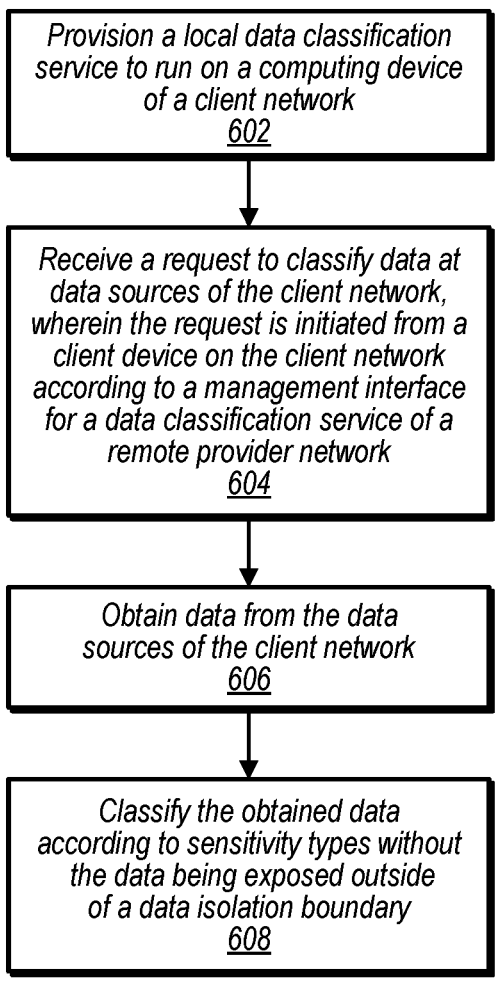
FIG. 6 is a flow diagram illustrating classifying data at a client network, according to some embodiments.

FIG. 6 is a flow diagram illustrating classifying data at a client network, according to some embodiments.

At block 602, a data classification service of a remote provider network provisions a local data classification service to run on a computing device of a client network. At block 604, the local data classification service receives a request to classify data at data sources of the client network, wherein the request is initiated from a client device on the client network according to a management interface for a data classification service of a remote provider network.

At block 606, the local data classification service obtains data from the data sources of the client network. At block 608, the local data classification service classifies the obtained data according to sensitivity types without the data being exposed outside of a data isolation boundary.

Figure 7:
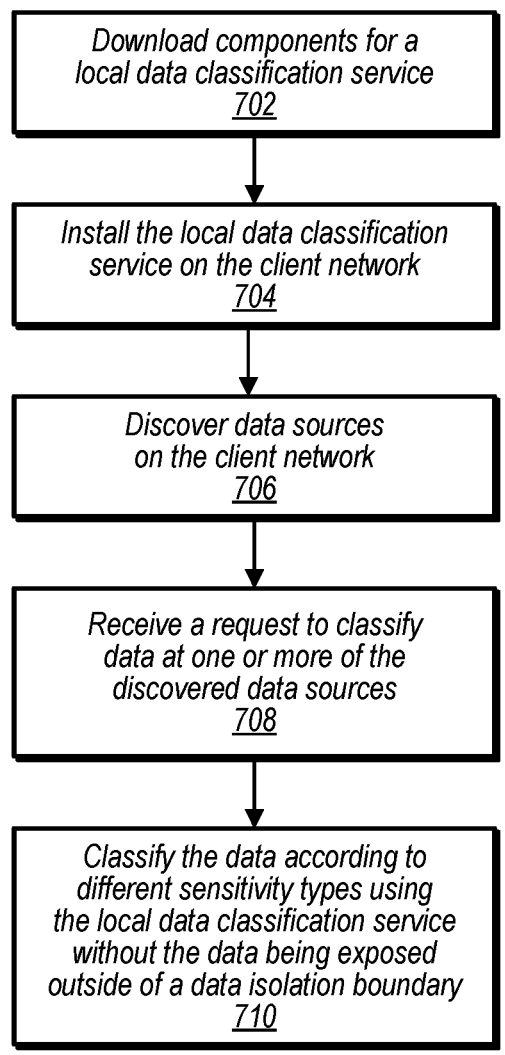
FIG. 7 is a flow diagram illustrating installing a local data classification service at a client network and classifying data using the local data classification service, according to some embodiments.

FIG. 7 is a flow diagram illustrating installing a local data classification service at a client network and classifying data using the local data classification service, according to some embodiments.

At block 702, the client network downloads components for a local data classification service. At block 704, the client installs the local data classification service on the client network. At block 706, the local data classification service discovers data sources on the client network.

At block 708, the local data classification service receives a request to classify data at one or more of the discovered data sources. At block 710, the local data classification service classifies the data according to different sensitivity types without the data being exposed outside of a data isolation boundary.

Figure 8:
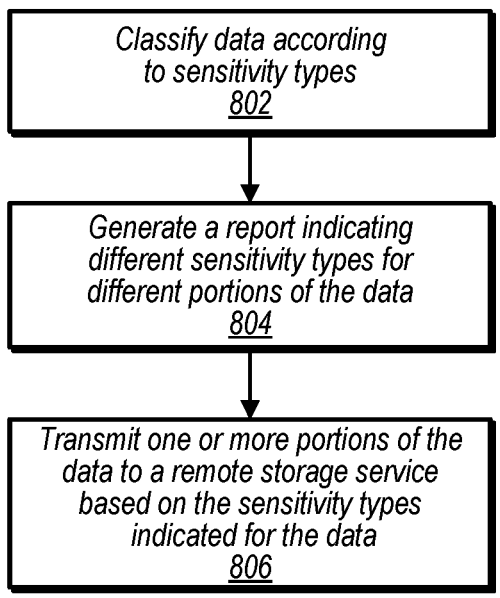
FIG. 8 is a flow diagram illustrating classifying data at a client network and transmitting some of the data to a remote storage service based on the sensitivity types of the classified data, according to some embodiments.

FIG. 8 is a flow diagram illustrating classifying data at a client network and transmitting some of the data to a remote storage service based on the sensitivity types of the classified data, according to some embodiments.

At block 802, the local data classification service classifies data according to sensitivity types. At block 804, the local data classification service generates a report indicating different sensitivity types for different portions of the data. At block 806, the local data classification service transmits one or more portions of the data to a remote storage service based on the sensitivity types indicated for the data.

Figure 9:
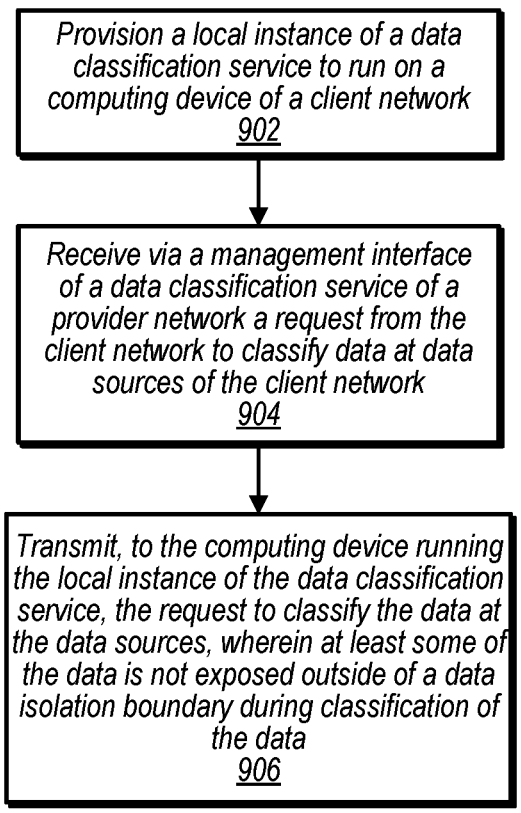
FIG. 9 is a flow diagram illustrating classifying data at a client network via a management interface of a remote provider network, according to some embodiments.

FIG. 9 is a flow diagram illustrating classifying data at a client network via a management interface of a remote provider network, according to some embodiments.

At block 902, a remote data classification service of a remote provider network provisions a local instance of a data classification service to run on a computing device of a client network. At block 904, a management interface of the remote data classification service receives from the client network a request to classify data at data sources of the client network.

At block 906, the management interface of the remote data classification service transmits, to the computing device running the local instance of the data classification service, the request to classify the data sources. In embodiments, the data being classified is not exposed outside of a data isolation boundary during classification of the data.

Figure 10:
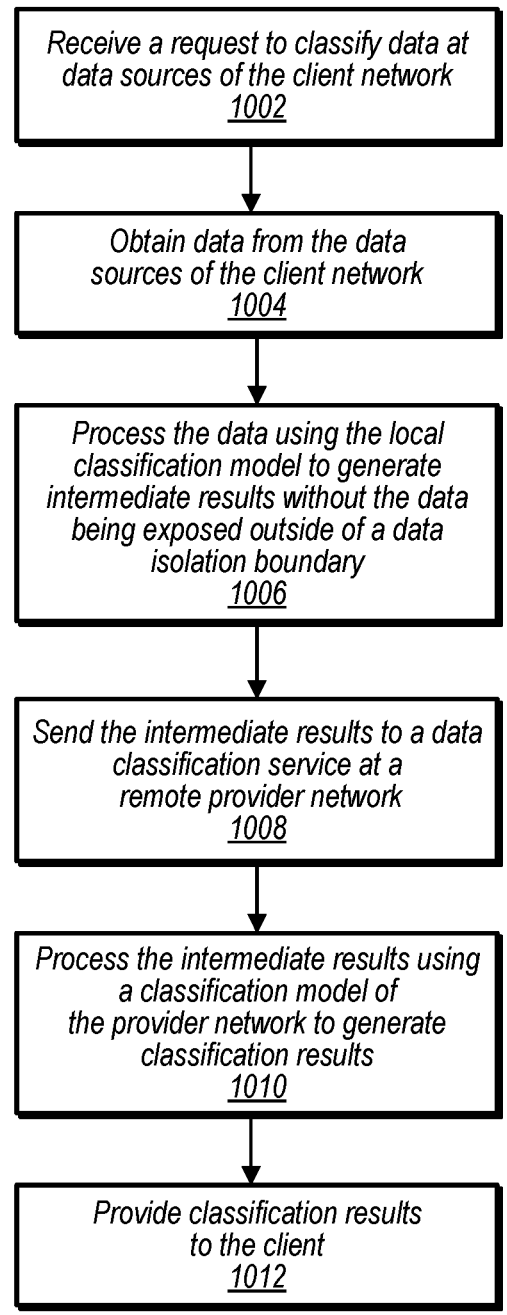
FIG. 10 is a flow diagram illustrating split data classification between a classification service of a provider network and a local data classification service, according to some embodiments.

FIG. 10 is a flow diagram illustrating split data classification between a classification service of a provider network and a local data classification service, according to some embodiments.

At block 1002, a local data classification service receives a request to classify data at data sources of the client network. At block 1004, the local data classification service obtains data from the data sources of the client network. At block 1006, the local data classification service processes the data using the local classification model to generate intermediate results without the data being exposed outside of the data isolation boundary.

At block 1008, the local data classification service sends the intermediate results to the data classification service of the provider network. At block 1010, the data classification service processes the intermediate results using a classification model to generate data classification results. At block 1012, these data classification results may then be provided to the client network (e.g., to the local data classification service). In embodiments, the local data classification service may perform one or more actions based on the received results (e.g., issue one or more commands to another client device of the client network).

Figure 11:
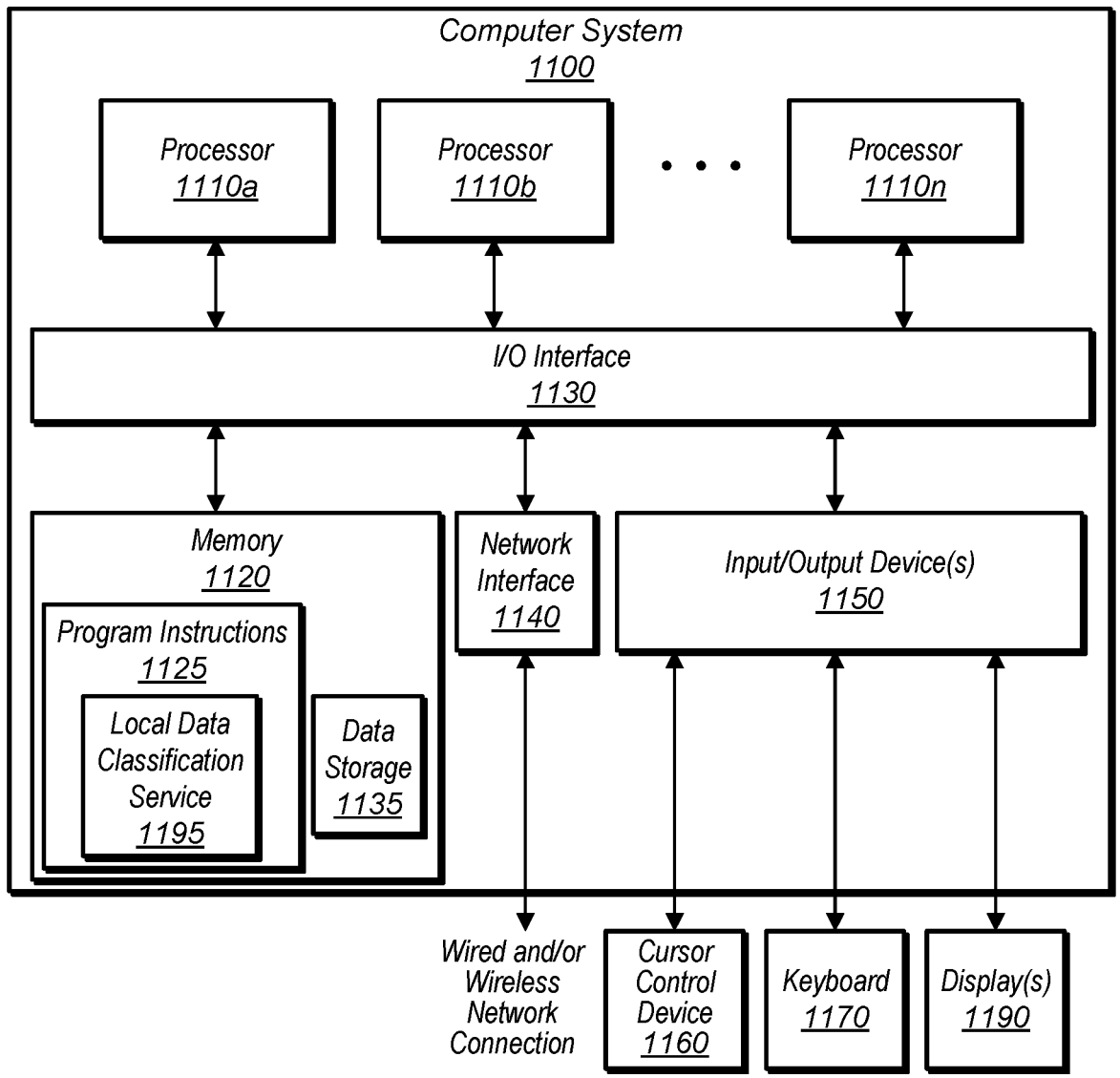
FIG. 11 is a block diagram illustrating an example computer system that implements some or all of the techniques described herein, according to some embodiments.

Any of various computer systems may be configured to implement processes associated with classifying data at a client network based on a data classification service of a remote provider network. For example, FIG. 11 is a block diagram illustrating one embodiment of a computer system suitable for implementing at least some of the systems and methods described herein. In various embodiments, the connected devices 100, computing devices that implement services of the provider network 102 or client network 116, and/or any other described components may each include one or more computer systems 1100 such as that illustrated in FIG. 11 or one or more components of the computer system 1100 that function in a same or similar way as described for the computer system 1100.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers or other computing devices implementing a data classification service, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the data classification service are shown stored within system memory 1120 as program instructions 1125 (e.g., local data classification service 1195 at a client network and/or a data classification service at the provider network). In some embodiments, system memory 1120 may include data 1135 which may be configured as described herein.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as between the connected device 100 and other computer systems, for example. In particular, network interface 1140 may be configured to allow communication between computer system 1100 and/or various I/O devices 1150. I/O devices 1150 may include scanning devices, display devices, input devices and/or other communication devices, as described herein. Network interface 1140 may commonly support one or more wireless networking protocols (e.g., Wi-Fi/IEEE 802.9, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In some embodiments, I/O devices 1150 may be relatively simple or "thin" client devices. For example, I/O devices 1150 may be configured as dumb terminals with display, data entry and communications capabilities, but otherwise little computational functionality. However, in some embodiments, I/O devices 1150 may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices 1150 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1150 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device 1150 (e.g., cursor control device, keyboard, or display(s) may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the connected devices, various services or components of the provider network, client network, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices of a provider network comprising respective processors and memory to implement a network-based data classification service to:
receive intermediate results from a remote network of a client, wherein the intermediate results received at the provider network are based on processing, at the remote network of the client, of data obtained from one or more data sources of the remote network using a client classification model of the remote network,
and wherein the intermediate results do not expose at least some of the obtained data to prevent sensitive data from being exposed outside of a data isolation boundary associated with the client;
process the intermediate results received from the remote network of the client using a provider classification model at the provider network to generate classification results; and
transmit the classification results to an endpoint.

2. The system as recited in claim 1, wherein the network-based data classification service is configured to:
receive other intermediate results from another remote network of another client of the provider network, wherein the other intermediate results are based on processing of other data obtained from one or more data sources of the other remote network using a client classification model of the other remote network,
and wherein the other intermediate results do not expose at least some of the other obtained data;
process the other intermediate results using the provider classification model to generate other classification results; and
transmit the other classification results to the endpoint or another endpoint.

3. The system as recited in claim 1, wherein to transmit the classification results to the endpoint, the network-based data classification service is configured to:
transmit the classification results to the remote network, a client data classification service of the remote network, or another network.

4. The system as recited in claim 1, wherein the intermediate results are based on classification of the obtained data according to different types of sensitivity without at least a portion of the obtained data being exposed outside of the data isolation boundary of the remote network.

5. The system as recited in claim 1, wherein the network-based data classification service is configured to:
provide a client data classification service to the remote network, wherein the client data classification service runs the client classification model.

6. The system as recited in claim 5, wherein the network-based data classification service is configured to:
download to the remote network a data classification engine and an execution environment to run the data classification engine within the client data classification service.

7. The system as recited in claim 5, wherein the network-based data classification service is configured to:
transmit updates for the client classification model to the client data classification service, wherein the updates are configured to update the client classification model.

8. A method, comprising:
performing, by a network-based data classification service implemented by one or more computing devices of a provider network:
receiving intermediate results from a remote network of a client, wherein the intermediate results received at the provider network are based on processing, at the remote network of the client, of data obtained from one or more data sources of the remote network using a client classification model of the remote network,
and wherein the intermediate results do not expose at least some of the obtained data to prevent sensitive data from being exposed outside of a data isolation boundary associated with the client;
processing the intermediate results received from the remote network of the client using a provider classification model at the provider network to generate classification results; and
transmitting the classification results to an endpoint.

9. The method as recited in claim 8, further comprising:
receiving other intermediate results from another remote network of another client of the provider network, wherein the other intermediate results are based on processing of other data obtained from one or more data sources of the other remote network using a client classification model of the other remote network,
and wherein the other intermediate results do not expose at least some of the other obtained data;
processing the other intermediate results using the provider classification model to generate other classification results; and
transmitting the other classification results to the endpoint or another endpoint.

10. The method as recited in claim 8, wherein transmitting the classification results to the endpoint comprises:
transmitting the classification results to the remote network, a client data classification service of the remote network, or another network.

11. The method as recited in claim 8, wherein the intermediate results are based on classification of the obtained data according to different types of sensitivity.

12. The method as recited in claim 8, further comprising:
providing a client data classification service to the remote network, wherein the client data classification service runs the client classification model.

13. The method as recited in claim 12, further comprising:
downloading to the remote network a data classification engine and an execution environment to run the data classification engine within the client data classification service.

14. The method as recited in claim 12, further comprising:
transmitting updates for the client classification model to the client data classification service, wherein the updates are configured to update the client classification model.

15. A non-transitory computer-readable storage medium storing program instructions that, when executed by one or more computing devices of a client network, cause the one or more computing devices to:
- implement a client data classification service to:
  - obtain data from one or more data sources of the client network;
  - classify the obtained data using a client classification model of the client data classification service to generate intermediate results, wherein the intermediate results do not expose at least some of the obtained data to prevent sensitive data from being exposed outside of a data isolation boundary associated with the client; and
  - transmit the intermediate results to a remote data classification service of a remote provider network; and
  - receive, from the remote provider network, classification results based on processing of the intermediate results by a provider classification model of the remote data classification service.

16. The computer-readable storage medium as recited in claim 15, wherein the intermediate results are classified according to different types of sensitivity without at least a portion of the obtained data being exposed outside of the data isolation boundary of the remote network.

17. The computer-readable storage medium as recited in claim 16, wherein the intermediate results are classified without at least a portion of the obtained data being exposed outside of the data isolation boundary of the remote network.

18. The computer-readable storage medium as recited in claim 15, wherein the program instructions cause the one or more computing devices to:
- obtain the client data classification service from the provider network.

19. The computer-readable storage medium as recited in claim 15, wherein the program instructions cause the one or more computing devices to:
- download to the remote network a data classification engine and an execution environment to run the data classification engine within the client data classification service.

20. The computer-readable storage medium as recited in claim 15, wherein the program instructions cause the one or more computing devices to:
- obtain updates for the client classification model, wherein the updates are configured to update the client classification model.

* * * * *